Patented Dec. 23, 1947

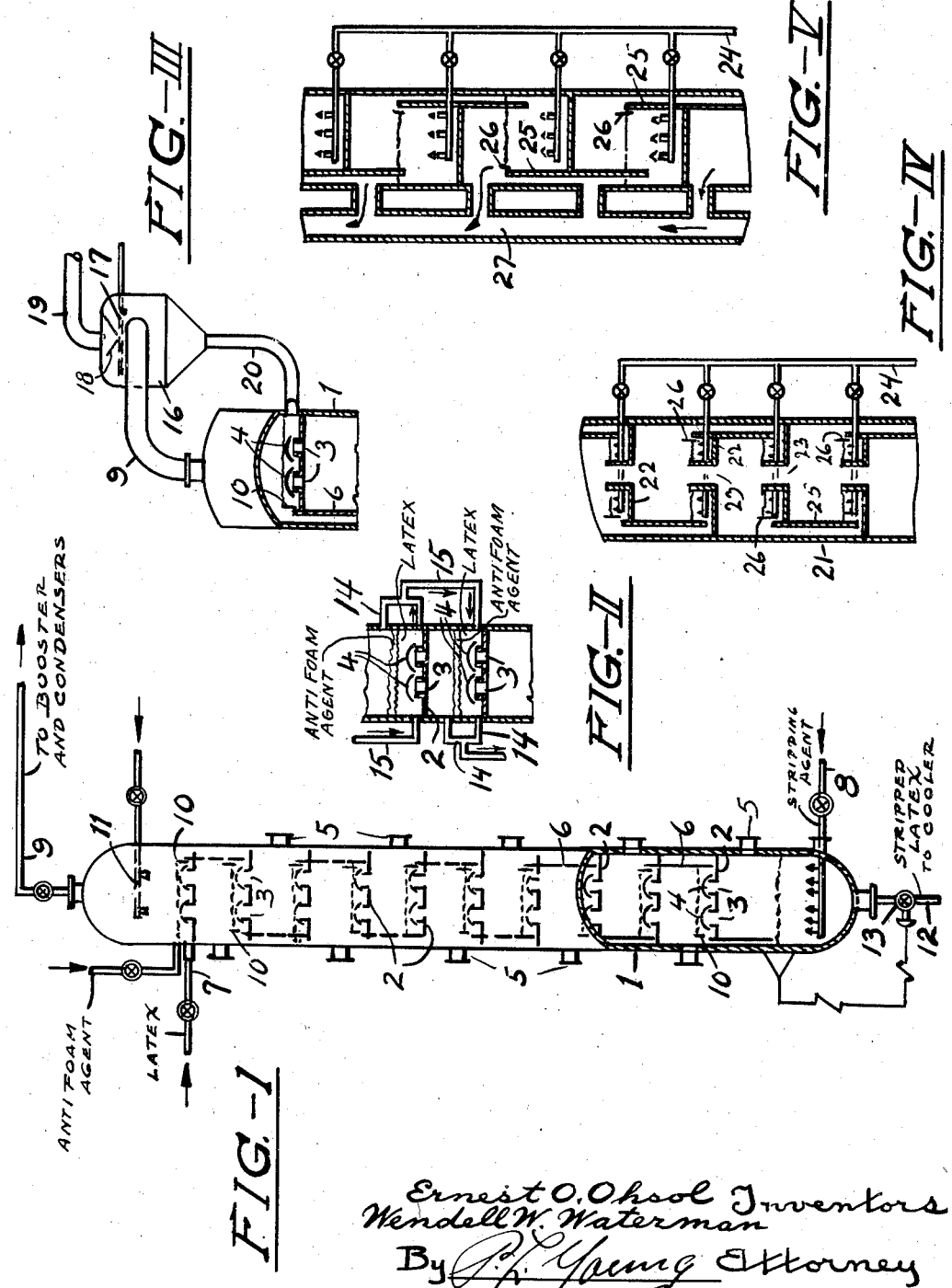

2,433,060

UNITED STATES PATENT OFFICE 2,433,060

PROCESS OF STRIPPING EMULSION POLYMERIZATE LATICES

Ernest O. Ohsol, Rahway, and Wendell W. Waterman, Cranford, N. J., assignors to Standard Oil Development Company, a corporation of Delaware Application January 1, 1943, Serial No. 471,078

21 Claims. (Cl. 202—46)

This application pertains to the preparation of emulsion polymerizates and particularly to the production of emulsion polymerizates of synthetic rubber-like material.

In the production of polymerization products in aqueous emulsion, 100% conversion of the monomeric materials can not ordinarily be obtained since the physical properties of the polymer, particularly those of a rubbery nature, may become unsatisfactory when conversions of about 70–80% are exceeded or excessively long times and/or high temperatures are required to obtain such high conversions. Accordingly, the reaction mixture obtained upon completion of the polymerization contains considerable amounts of unreacted polymerizable material. Since the presence of such materials exerts a detrimental effect upon the physical properties of the polymer and, as in the case of acrylonitrile, constitutes a definite health hazard, and since it is economical to recover the polymerizable monomers, it is obviously desirable, if not absolutely essential, that such monomeric materials be removed from the polymerization reaction mixture. In some cases, as for example in the polymerizations of mixtures comprising a butadiene, the monomeric material may be removed by simple flashing off down to atmospheric pressure or a suitable sub-atmospheric pressure. In other cases, however, it is necessary to strip the reaction mixture by the application of a stripping agent at atmospheric or under reduced pressure and at room or elevated temperature.

It is the object of the present invention to provide the art with a novel process and apparatus for continuously stripping off unreacted unsaturated, polymerizable materials from emulsion polymerization reaction mixtures.

It is a further object of the present invention to provide the art with a novel method of continuously stripping emulsion polymerization reaction mixtures in a plate type column.

It is also an object of this invention to provide the art with a plate type column for the continuous stripping of emulsion polymerization mixtures having means for maintaining a layer of anti-foam agent on the plates.

These and other objects will appear more clearly from the detailed description and claims which follow.

We have found that emulsion polymerizates, particularly those obtained by the polymerization of a diolefin or mixture of a diolefin hydrocarbon such as butadiene-1.3 with copolymerizable materials containing a single C=C linkage such as acrylonitrile, styrene, esters of acrylic and methacrylic acid, vinyl methyl ketone and the like may be effectively stripped of residues of unreacted monomeric materials by passing a stream of the emulsion through a plate type column having a definite, relatively large holdup on each plate and having suitable means for maintaining a layer of anti-foam agent on each plate.

The continuous stripping in accordance with the present invention has the following advantages over batch stripping:

1. Smaller labor requirements due to steady state conditions.
2. Less foaming tendency because of steady pressures.
3. More uniform product.
4. Less equipment investment and space requirement for a given rate of production when a continuous system is used.
5. Ease of control due to uniform operating conditions.
6. High recovery of unreacted material with a minimum consumption of stripping agent.
7. High degree of stripping with a minimum of degradation of the polymer.
8. A high service factor $$\left(\text{service factor} = \frac{\text{hours of productive operation}}{\text{total elapsed hours}}\right)$$

is inherent in continuous stripping.

In order to realize the aforesaid advantages of continuous stripping, it is necessary to have a system specially designed to be operable under any variation of the material handled that can reasonably be expected. For example, synthetic latices obtained by the polymerization of mixtures of diolefins with styrene or acrylonitrile under certain conditions may contain rubbery or stringy, sticky lumps and in practically all cases they show a marked tendency to foam under stripping conditions. We have found that in many cases the stripping of such latices is a desorption process requiring an appreciable length of time for its completion, which time must be provided in the design of the stripping system.

In the latex as it enters the stripping system, the unreacted monomeric olefins are believed to be retained in two ways, (1), as a solute in the aqueous phase, and (2), as adsorbate or solute in the solid polymer phase. The relative amounts of monomer in each phase will vary with the type of latex being stripped; for instance, in a latex comprising a butadiene-acrylonitrile copolymer the unreacted nitrile is soluble in the aqueous phase to the extent of about 9.5% by weight at 140° F., whereas in a latex comprising a butadiene-styrene copolymer the styrene is soluble in the aqueous phase to the extent of only about 0.15% by weight.

In the case of the butadiene-acrylonitrile copolymerizate the amount of unreacted nitrile in the latex is ordinarily below the limit of solubility in the aqueous phase, and consequently there is relatively little monomer associated with the polymer. On the other hand, in the case of the butadiene-stryrene copolymerizate where the solubility in the aqueous phase is very low, most of the styrene will be contained in the polymer. We have found that in the stripping of acrylonitrile from latices the rates of monomer removal and the requirements of stripping steam are substantially those which would be predicted on the basis of simple steam distillation of normal aqueous solutions. We have further found that in the stripping of styrene from latices, the rate of monomer removal is much lower and the steam requirement per unit of monomer removed much higher than would be predicted from the steam distillation of a styrene-water binary system. This indicates that desorption of monomer from the solid phase is a comparatively slow process.

In accordance with these observations, we find that insofar as provisions for desorption time are concerned, stripping equipment designed by conventional methods is adequate for the removal of monomers of the solubility characteristics of acrylonitrile from their latices. However, in order to attain a comparable degree of stripping in the case of monomers of the solubility characteristics of styrene, it is necessary to provide a much longer retention time in the stripping system than would normally be expected.

Beside the factors mentioned above relating to the minimum time required for stripping, there are in most cases limitations on the maximum time for which a synthetic rubber latex may be exposed to the relatively high stripping temperatures without causing appreciable degradation of the product quality, particularly in respect to tensile strength and processability characteristics. The allowable time of exposure before degradation becomes appreciable depends on the type of latex being stripped and on the presence or absence of additional materials, such as inorganic salts and reducing agents, and to a large extent on the stripping temperature. This allowable time is longer the lower the stripping temperature. The extent to which the stripping temperature may be lowered is limited by the extent to which it is economically practicable to reduce the stripping pressure.

A further complicating factor is the phenomenon of retention-like distribution. A bubble cap plate, across which the latex is flowing is usually a zone of fairly good mixing by reason of the vapors bubbling through it. Therefore, the liquid leaving the plate will be a fairly representative sample of all the liquid on the plate, and will contain some material which has just entered from the plate above as well as some material which has remained on the plate for a length of time considerably longer than the nominal residence time. The nominal residence time is defined as the total liquid volume holdup of the plate divided by the rate of liquid throughput as volume per unit time. In other words, the material leaving each plate may be considered as a composite of a large number of small fractions of volume unequal in magnitude but selected in such a way that a definite value of residence time may be assigned to each. The weighted average of these values of residence time is necessarily the nominal holding time of the plate.

If the amount of material in each fraction be plotted against residence time a curve is obtained showing the residence time distribution. This is in effect a probability curve and it may be shown that for a single plate or stage the fraction having the shortest residence time will be greater in magnitude than any other fraction, or in other words, the shortest possible residence time is more probable than any other residence time. The magnitudes of fractions of progressively greater residence times steadily diminish, approaching zero only at infinite holding time. With a system containing more than one plate, the distribution of time of residence in the system as a whole, becomes sharper with increasing number of plates, the most probable residence time approaching the nominal holding time of the system as the number of plates becomes infinitely great.

In view of the above holding time distribution considerations, and of the facts previously mentioned in regard to a substantial minimum time required for the stripping operation and to danger of over exposure of latex to stripping temperatures, it will be seen that there is a great problem in designing a column for stripping of latices so that sufficient time is allowed for complete stripping of essentially all the latex, without causing appreciable injury to any substantial fraction of the latex. This problem is not encountered in ordinary stripping column design.

It is relatively easy to overcome any one of the difficulties mentioned above at the expense of neglecting one or more of the other problems, for instance, injury to the latex might be avoided by using perforated plates and a low overall holding time, but completeness of stripping of the latex will in many cases be sacrificed; or foaming could be minimized by use of a very low steam rate at the expense of completeness of stripping or of over exposure of the latex.

We have found that by use of a plate type column with proper choice of stripping pressure (and thus, stripping temperature), number of plates, column diameter, and by control of the depth of latex on each plate consistent with the type of latex handled and rate of throughput, as specified in detail in the example, it is possible to solve all of these problems and accomplish the objects of this invention as stated above.

For a more complete understanding of the invention, reference is made to the accompanying drawing wherein several embodiments of our invention are illustrated. In the drawing, Figure I is a diagrammatic illustration in vertical section of a plate type column in accordance with the present invention.

Figure II shows an alternative arrangement of downcomers.

Figure III shows the column of Figure I provided with a special foam separator.

Figures IV and V show two modifications of the present invention as applied to a non-countercurrent plate column.

Referring to Figure I, 1 is a column or casing containing a plurality of spaced plates 2 containing openings 3 for the passage of vapors therethrough. The openings 3 are covered with bubble caps 4. In view of the stringy and sticky characteristics of the latex, the bubble caps 4 should be provided with relatively large slots and should be designed for easy cleaning. Manholes or handholes 5 should preferably be provided at every plate or at every other plate to facilitate inspection and cleaning of the plates, bubble caps and the like.

Downcomers 6 are provided to convey the latex from each plate to the next lower plate, the downcomers in each case extend some distance above the plate to form a dam of such a height to maintain a substantial, definite depth of latex on each plate in accordance with the specification below.

The latex to be stripped, which has been discharged from the polymerization zone and flashed to a suitably low pressure in order to remove most of the light ends such as unpolymerized butadiene, and which has preferably been treated with a suitable stabilizer and/or inhibitor, such as phenyl-beta-naphthylamine and hydroquinone, is supplied to the topmost plate of the column through line 7 and the stripping agent, preferably steam, is supplied at a uniform rate through line 8 at the bottom of the column. This column is operated under 10–760 millimeters of mercury absolute pressure, or preferably 50–200 millimeters. The vapors pass upwardly in countercurrent to the latex and are withdrawn through line 9. In order to counteract the foaming tendencies of the latex, a layer of a heavy anti-foam agent such as lanolin or candelilla wax is floated on the surface of the latex on each plate. One way of doing this is to add the anti-foaming agent to the feed and allow it to overflow from plate to plate. The agent may be recovered after stripping is complete by settling, if desired, before coagulation.

The preferred way is to make the downcomers from each plate take latex from below the surface so that a layer of antifoam agent floats on each plate and most of it stays there. In this case only a small amount would need to be added to each plate or to the feed. This may be done as shown in Figure I by providing a second dam 10 adjacent the inlet of each downcomer and submerged below the crest of the dam formed by the downcomer a sufficient distance to maintain a layer of anti-foam agent on each plate. In this arrangement, the latex flows under dam 10 into the downcomer while the anti-foam agent is trapped on the surface of the latex.

In order further to break the foam and prevent entrainment of latex in the vapors withdrawn through line 9, it is advisable to provide a disengaging space of at least 5 feet and better about 8 feet, or under certain conditions even 10 feet, in the column above the top plate. The disengaging of foam may also be aided by the use of a water spray 11 in the top of the tower or by baffles.

The stripped latex is withdrawn from the tower through line 12 which may be provided with a valve 13 controlled by the liquid level in the base of the tower by aid of a suitable latex pump if necessary, and may be passed, if desired, to a suitable cooler.

In order to minimize foaming it is advisable to design the column diameter for low vapor velocities. In general, the vapor velocity should be from about 10 to about 50% of allowable entrainment velocities that might be used for non-foaming liquids. It is also advisable to use well controlled constant pressure in the column, for example, by automatically controlling steam rate to maintain a constant pressure in the column, or by automatically maintaining a constant pressure by control of the booster or vacuum pump and automatically controlling steam flow at a constant rate. Foaming may also be minimized by removing most of the butadiene or other light ends prior to introduction of the latex into the stripping column by flashing preferably to substantially less than atmospheric pressure.

The latex flowing across each plate, vigorously agitated by the vapors bubbling out of the bubble caps, should nowhere be permitted to collect in pockets, so that clogging or over exposure may be avoided. The latex holdup of the bottom section of the column is at a minimum consistent with level control, and may be held as low as 1 or 2 ft. The depth of latex maintained on each plate by suitable adjustment of the weir heights is a definite figure. In the case of styrene-latex stripping it should be substantially greater than is usual in plate column construction, and should be determined in accordance with the example given below.

Figure II shows a suitable arrangement of downcomers externally of the column. In this arrangement a tube 14 is provided which connects into the column below the liquid level on each plate and at a point above the maximum depth of latex and anti-foam agent desired on each plate. A second tube 15 connects into the tube 14 at a point corresponding to the maximum depth of latex desired on each plate and extends downwardly to a point below the liquid level on the next lower plate. The latex flows upwardly in tube 14 to the connection with tube 15 and downwardly in tube 15 to the next lower plate, the upper end of tube 14 acting as a syphon breaker.

Figure III shows a suitable arrangement for further disengaging any foam that may be entrained in the vapors withdrawn from the column. In this arrangement line 9 discharges tangentially into separator 16. A water spray or the like 17 may be provided to break any foam present and a baffle 18 may be provided adjacent the vapor outlet from the separator. The vapors, free from foam, are withdrawn through line 19. The particles of foam separated in separator 16 are returned to the top plate of the column, below the liquid level, through line 20.

In cases where the latices to be stripped foam very badly and/or plug the bubble caps it is preferable to conduct the stripping without countercurrent flow of the latex and stripping agent. Figures IV and V show two arrangements for stripping latices in a plate column without countercurrent flow. In Figure IV the column comprises a casing 21 provided with a plurality of plates 22, each of which is provided with a large central opening 23 for the passage of vapors. Steam or any suitable stripping agent is supplied separately to each plate from supply line 24. The arrangement of downcomers 25 and dams 26 is the same as that shown in Figure I.

In Figure V, an external flue 27 is provided to carry off the vapors evolved and in this case also stripping agent is supplied separately to each plate from supply line 24. The downcomers 25 and dams 26 function in the same way as in Figure I.

The following example is illustrative of the present invention but it is to be understood that our invention is not limited thereto.

*Example 1*

A latex is prepared by polymerizing a mixture of butadiene and styrene in the ratio of 3 to 1 in aqueous emulsion using a 2 to 1 ratio of water to reactants with about 2½% of sodium oleate as emulsifier, 0.25% of "Lorol" mercaptan as polymerization modifier and about 0.2% of potassium persulfate as catalyst. The percentages given are based on the water present in the emulsion. The mixture is polymerized to 67% styrene conversion whereupon the butadiene is flashed off, a stabilizer (phenyl-beta-naphthylamine) is added and the latex is then stripped of monomeric styrene.

Using a bubble plate column having an internal diameter of 90" and handling 9000#/hr. (18.6 gallons per minute) of the aforesaid latex injecting 2500#/hr. of steam and operating at a pressure of 150 mm. Hg absolute and a maximum temperature of 140° F., the following holdups are required for the indicated degrees of stripping:

| No. of Plates | Percent Styrene Removal | Depth of Liquid on Each Plate | Nominal Holdup Time in Column Minutes | Percent of Latex Held in Column Longer Than 4 Hrs. |
|---|---|---|---|---|
|  |  | *Inches* |  |  |
| 5 | 93.0 | 11½ | 95 | 1.5. |
|  | 96.5 | 14½ | 120 | 3. |
|  | 99.2 | 22 | 180 | 22. |
| 10 | 96.4 | 6 | 95 | Less than 0.5. |
|  | 98.7 | 7½ | 120 | 1. |
|  | 99.9+ | 11 | 180 | 15. |
| 20 | 98.1 | 3 | 95 | Less than 0.5. |
|  | 99.8 | 3¾ | 120 | Do. |
|  | 99.9+ | 5½ | 180 | 8. |

The number of plates provided in the stripping column in accordance with the present invention may be varied over an appreciable range. In order to obtain fairly complete stripping of styrene and the like from latices containing the same in from about 1½ to 3 hours nominal holdup time, it is preferable to provide about 10 to 20 plates per column although fewer plates may be used if the depth of latex on each plate is suitably increased. However, with a smaller number of plates and enough liquid on each plate to give sufficient holding time for good stripping, the effective holding time is increased as indicated in the table by the higher percentage retained longer than 4 hours. This may cause injury to the latex. Latices containing acrylonitrile are particularly sensitive in this respect, and subjection of a substantial portion of latex to temperature of 140 to 160° F. or above for times exceeding 4 or 5 hours will cause noticeable deterioration.

It is preferable to operate the stripping column at pressures between about 75 to about 250 mm. Hg absolute although pressures either above or below these limits may be applied.

*Example 2*

A latex is prepared by polymerizing a mixture of butadiene and acrylonitrile in the ratio of 2.84 to 1 by weight in aqueous emulsion using a ratio of water to reactants of 2 to 1 by weight, and using 2½ percent by weight of oleic acid and 0.3 percent of sodium hydroxide, based on the water, as emulsifier. Also, 0.25 percent by weight of dodecyl mercaptan and 0.15 percent by weight of potassium persulfate based on the water, are added as modifier and catalyst, respectively. The mixture, after being emulsified at 30° C., is allowed to polymerize at 40° C. and a pH of 8.0–8.6 for 14 hours, during which time about 76% of the butadiene and acrylonitrile copolymerize. Two percent of phenyl-beta-naphthylamine and one half percent of hydroquinone are added after flashing off the excess butadiene, and the thus stabilized latex is fed to a 90" internal diameter column operating at 100 mm. of mercury absolute pressure, and equipped with five bubble-cap plates. The total depth of latex on each plate is about 4 to 6 inches. A layer of lanolin about ¼ inch thick is maintained on the surface of the latex on each plate by admitting the melted antifoam agent through steam-traced ¼" pipes running to each plate.

The latex is supplied to the column at the rate of 22,000 pounds per hour, and steam is admitted to the bottom section of the column at the rate of 865 pounds per hour. It was found that the latex leaving the bottom of the column contains about 0.00011 mol percent acrylonitrile, corresponding to an acrylonitrile recovery of better than 99.5 percent. No deterioration of the quality of the latex is found, as the tensile strength of 3600#/sq. in., 400 percent elongation and Williams plasticity-recovery values of 100–6 of the coagulated and cured product, correspond to those obtained upon evaluation of the coagulate from unstripped latex which has been purified by washing with isopropyl alcohol.

The process and apparatus of the present invention can be used to strip unpolymerized, unsaturated materials such as monoolefinic or heavier diolefinic materials from a large variety of polymer emulsions. For example, it may be used to strip nitriles from emulsions obtained in the production of diolefin-nitrile copolymerizates such as butadiene-acrylonitrile emulsion copolymerizates or styrene from synthetic rubber-like butadiene-styrene emulsion copolymers or isoprene and styrene from the resinous, modified styrene copolymer prepared in accordance with the teachings of application Serial No. 408,814, filed August 29, 1941, by Gleason et al. It may also be used to strip unpolymerized styrene or acrylonitrile or homologues thereof or diolefinic materials such as chloroprene, cyanoprene and dimethyl butadiene from the reaction mixtures obtained when polymerizing such polymerizable olefinic or diolefinic materials in aqueous emulsion. The method of preparing the emulsion polymerizates is immaterial to the present invention and the latter may be applied thereto so long as the reaction mixture contains unpolymerized olefinic materials in an amount sufficient either to warrant recovery or to be objectionable in the final product.

While the foregoing description contains a number of specific illustrations, it will be understood that these are not limitative of the present invention since numerous variations are possible within the purview of the invention as defined in the following claims.

What we claim and desire to secure by Letters Patent is:

1. The process of continuously stripping unpolymerized unsaturated materials from a latex prepared by emulsion polymerization which comprises passing a stream of latex downwardly through a plate column, maintaining a substantial depth of latex and an upper layer of a wax serving as anti-foam agent on each plate of the column, contacting the latex in the column with a stripping agent, continuously withdrawing stripping vapors and stripped latex from the column and maintaining the feed rate of the latex sufficiently high relative to the volume of latex retained in the common that no appreciable degradation of the latex occurs due to excessively prolonged exposure of the latex to the stripping temperatures.

2. The process of continuously stripping styrene from a latex prepared by emulsion polymerization of a diolefin hydrocarbon and styrene which comprises passing a stream of latex downwardly through a plate column maintaining a substantial depth of latex and an upper layer of a wax serving as anti-foam agent on each plate of the column, contacting the latex in the column with a stripping agent, continuously withdrawing stripping vapors and stripped latex from the column, so proportioning number of plates and depth of latex on each plate and the latex feed rate that the effective holdup time is sufficient to ensure adequate stripping but not long enough to cause appreciable degradation of the latex in the column, due allowance being made for holding time distribution.

3. The process as defined in claim 2 wherein the stripping agent is steam.

4. The process of continuously stripping unpolymerized unsaturated materials from a latex prepared by emulsion polymerization which comprises passing a stream of latex downwardly through a plate column, maintaining a substantial layer of latex and an upper layer of a wax serving as anti-foam agent on each plate of the column, contacting the latex in the column countercurrently with a stripping agent, continuously withdrawing stripping vapors and stripped latex from the column and so proportioning number of plates, depth of latex on each plate and the latex feed rate that the effective holdup time is sufficient to ensure adequate stripping but not long enough to cause appreciable degradation of the latex in the column, due allowance being made for holding time distribution.

5. The process of continuously stripping acrylonitrile from a latex prepared by emulsion polymerization of a diolefin hydrocarbon and acrylonitrile which comprises passing a stream of latex downwardly through a plate column maintaining a substantial layer of latex and an upper layer of a wax serving as anti-foam agent on each plate of the column, contacting the latex in the column countercurrently with a stripping agent, continuously withdrawing stripping vapors and stripped latex from the column and so proportioning number of plates, depth of latex on each plate and the latex feed rate that the effective holdup time is sufficient to ensure adequate stripping but not long enough to cause appreciable degradation of the latex in the column, due allowance being made for holding time distribution.

6. The process of continuously stripping unpolymerized unsaturated materials from a latex prepared by emulsion polymerization which comprises passing a stream of latex downwardly through a plate column, maintaining a suitable depth of latex and an upper layer of a wax serving as anti-foam agent on each plate of the column, contacting the latex in the column with a stripping agent and continuously withdrawing stripping vapors and stripped latex from the column.

7. The process of continuously stripping unpolymerized unsaturated materials from a latex prepared by emulsion polymerization which comprises passing a stream of latex downwardly through a plate column maintained at a pressure of about 100–250 mm. Hg absolute, maintaining a suitable depth of latex and an upper layer of a wax serving as anti-foam agent on each plate of the column, contacting the latex in the column countercurrently with a stripping agent, continuously withdrawing stripping vapors and stripped latex from the column and so proportioning number of plates, depth of latex on each plate and the latex feed rate that the effective holdup time is sufficient to ensure adequate stripping but not long enough to cause appreciable degradation of the latex in the column, due allowance being made for holding time distribution.

8. The process as defined in claim 7 wherein the stripping agent is steam.

9. The process of continuously stripping unpolymerized materials from a latex prepared by emulsion polymerization which comprises passing a stream of latex downwardly through a plate column maintained at a pressure of about 100–250 mm. Hg absolute, maintaining a suitable depth of latex and an upper layer of a wax serving as anti-foam agent on each plate of the column, separately introducing steam into the latex pool on each plate, combining the stripping vapors and continuously withdrawing the stripping vapors and the stripped latex from the column and so proportioning the number of plates, the depth of latex on each plate and the latex feed rate that the effective hold-up time is sufficient to ensure adequate stripping but not long enough to cause appreciable degradation of the latex in the column, due allowance being made for holding time distribution.

10. The process of continuously stripping styrene from a latex prepared by the emulsion polymerization of a diolefin hydrocarbon and styrene which comprises passing a stream of latex downwardly through a five to seven plate column maintained at an absolute pressure of about 100–250 mm. Hg, maintaining a suitable depth of latex and an upper layer of a wax serving as anti-foam agent on each plate of the column, controlling the rate of supply of the latex to the column to provide a maximum total holding time on the plates of between 60 and 200 minutes, maintaining a temperature in the column of not more than 180° F. and injecting from 3 to 10 pounds of steam per pound of styrene recovered and continuously withdrawing stripping vapors and stripped latex from the column.

11. The process of continuously stripping styrene from a latex prepared by the emulsion polymerization of a diolefin hydrocarbon and styrene which comprises passing a stream of latex downwardly through an eight to fourteen plate column maintained at an absolute pressure of about 100–250 mm. Hg, maintaining a suitable depth of latex and an upper layer of a wax serving as anti-foam agent on each plate of the column, controlling the rate of supply of the latex to the column to provide a maximum total holding time on the plates of between 50 and 200 minutes, maintaining a temperature in the column of not more than 180° F. and injecting from 3 to 10 pounds of steam per pound of styrene recovered and continuously withdrawing stripping vapors and stripped latex from the column.

12. The process of continuously stripping styrene from a latex prepared by the emulsion polymerization of a diolefin hydrocarbon and styrene which comprises passing a stream of latex downwardly through a fifteen to twenty-five plate column maintained at an absolute pressure of about 100–250 mm. Hg, maintaining a suitable depth of latex and an upper layer of a wax serving as anti-foam agent on each plate of the column, controlling the rate of supply of the latex to the column to provide a maximum total holding time on the plates of between 40 and 200 minutes, maintaining a temperature in the column of not more than 180° F. and injecting from 3 to 10 pounds of steam per pound of styrene recovered and continuously withdrawing stripping vapors and stripped latex from the column.

13. The process of continuously stripping acrylonitrile from a latex prepared by the emulsion polymerization of a mixture of a diolefin hydrocarbon and acrylonitrile which comprises passing a stream of said latex downwardly through a plate column maintained at a pressure of about 75-200 mm. Hg absolute, maintaining a suitable depth of latex and an upper layer of a wax serving as anti-foam agent on each plate of the column, contacting the latex in the column with steam to strip unpolymerized acrylonitrile from the latex, continuously withdrawing the stripping vapors and stripped latex from the column and so proportioning the number of plates, depth of latex on each plate and the latex feed rate that the effective holdup time is sufficient to ensure adequate stripping but not long enough to cause appreciable degradation of the latex in the column, due allowance being made for holding time distribution.

14. The process of continuously stripping unpolymerized acrylonitrile from a latex prepared by the emulsion polymerization of a mixture of a diolefin hydrocarbon and acrylonitrile which comprises passing a stream of latex downwardly through a plate column maintained at a pressure of about 75-200 mm. Hg absolute, maintaining a suitable depth of latex and an upper layer of a wax serving as anti-foam agent on each plate of the column, separately introducing steam into the latex pool on each plate to strip unpolymerized acrylonitrile from the latex, combining the stripping vapors, continuously withdrawing the stripping vapors and stripped latex from the column and so proportioning the number of plates, the depth of latex on each plate and the latex feed rate that the effective holdup time is sufficient to ensure adequate stripping but not long enough to cause appreciable degradation of the latex in the column, due allowance being made for holding time distribution.

15. The process as defined in claim 7 wherein the latex is withdrawn from beneath the layer of anti-foam agent on each plate and fed beneath the layer of anti-foam agent on the next lower plate.

16. The process as defined in claim 9 wherein the latex is withdrawn from beneath the layer of anti-foam agent on each plate and fed beneath the layer of anti-foam agent on the next lower plate.

17. The process as defined in claim 10 wherein the latex is withdrawn from beneath the layer of anti-foam agent on each plate and fed beneath the layer of anti-foam agent on the next lower plate.

18. The process as defined in claim 11 wherein the latex is withdrawn from beneath the layer of anti-foam agent on each plate and fed beneath the layer of anti-foam agent on the next lower plate.

19. The process as defined in claim 12 wherein the latex is withdrawn from beneath the layer of anti-foam agent on each plate and fed beneath the layer of anti-foam agent on the next lower plate.

20. The process as defined in claim 13 wherein the latex is withdrawn from beneath the layer of anti-foam agent on each plate and fed beneath the layer of anti-foam agent on the next lower plate.

21. The process as defined in claim 14 wherein the latex is withdrawn from beneath the layer of anti-foam agent on each plate and fed beneath the layer of anti-foam agent on the next lower plate.

ERNEST O. OHSOL.
WENDELL W. WATERMAN.

REFERENCES CITED

The following references are of record in the file of this patent:

UNITED STATES PATENTS

| Number | Name | Date |
| --- | --- | --- |
| 2,147,094 | Heckmann | Feb. 14, 1939 |
| 2,197,199 | Welch | Apr. 16, 1940 |
| 2,224,986 | Potts et al. | Dec. 17, 1940 |
| 2,234,400 | Evans et al. | Mar. 11, 1941 |
| 2,350,584 | Buell et al. | June 6, 1944 |
| 1,782,735 | MacKenzie | Nov. 25, 1930 |
| 1,862,758 | Merley | June 14, 1932 |
| 2,116,933 | Ragatz | May 10, 1938 |
| 2,362,052 | Craig | Nov. 7, 1944 |
| 2,161,798 | Carter | June 13, 1939 |
| 2,373,951 | Evans et al. | Apr. 17, 1945 |

FOREIGN PATENTS

| Number | Country | Date |
| --- | --- | --- |
| 619,168 | France | Mar. 28, 1927 |